US009013640B2

(12) United States Patent
Strohmaier

(10) Patent No.: US 9,013,640 B2
(45) Date of Patent: Apr. 21, 2015

(54) DVD MENU REPRESENTATION VIA OPTICAL CHARACTER RECOGNITION

(75) Inventor: Jason Strohmaier, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1291 days.

(21) Appl. No.: 12/025,551

(22) Filed: Feb. 4, 2008

(65) Prior Publication Data

US 2009/0195712 A1 Aug. 6, 2009

(51) Int. Cl.

| | |
|---|---|
| ***H04N 5/64*** | (2006.01) |
| ***H04N 21/422*** | (2011.01) |
| ***H04N 21/414*** | (2011.01) |
| ***H04N 21/426*** | (2011.01) |
| ***H04N 21/485*** | (2011.01) |
| *B60R 11/02* | (2006.01) |

(52) U.S. Cl.

CPC .. *H04N 21/42204* (2013.01); *B60R 2011/0288* (2013.01); *H04N 21/41422* (2013.01); *H04N 21/42646* (2013.01); *H04N 21/485* (2013.01)

(58) Field of Classification Search

CPC .................. H04N 21/42204; H04N 21/41422; H04N 21/42646; H04N 21/485; B60R 2011/0288

USPC .......... 348/836–843; 345/156, 168, 169, 173; 715/810, 821; 725/25

See application file for complete search history.

(56) References Cited

U.S. PATENT DOCUMENTS 5,661,811 A 8/1997 Huemann et al.
6,246,434 B1 * 6/2001 Takashima .................... 348/180
6,452,597 B1 9/2002 Goldberg et al.
6,708,086 B2 3/2004 Richard
7,046,848 B1 * 5/2006 Olcott ........................... 382/176
7,062,365 B1 6/2006 Fei
7,123,131 B2 * 10/2006 Arai ........................... 340/425.5
7,126,581 B2 10/2006 Burk et al.
7,190,798 B2 3/2007 Yasuhara
7,636,930 B2 * 12/2009 Chang ............................. 725/75
2002/0047900 A1 * 4/2002 Nishiyama et al. ........... 348/148
2005/0138662 A1 * 6/2005 Seto ............................... 725/75
2005/0169608 A1 * 8/2005 Shen et al. ...................... 386/95
2005/0172230 A1 * 8/2005 Burk et al. .................... 715/716
2005/0275651 A1 * 12/2005 Plut .............................. 345/211

FOREIGN PATENT DOCUMENTS

JP 2001-114027 4/2001
WO WO 2008072177 A1 * 6/2008

* cited by examiner

*Primary Examiner* — Joshua J Michener

*Assistant Examiner* — Theodore Adamos

(74) *Attorney, Agent, or Firm* — Mark E. Duell; Rankin, Hill & Clark LLP

(57) ABSTRACT

An entertainment system for a vehicle is provided comprising a front display screen in a front seat area of the vehicle and a rear display screen in a rear seat area of the vehicle. The entertainment system further provides a DVD player for reading a DVD including video content of the DVD. The DVD player can be connected to the rear display screen for displaying the video content of the DVD thereon. The video content can include a DVD menu. A controller can be connected to the DVD player and the front display screen. The controller generates a DVD menu representation corresponding to the DVD menu for display on the front display screen.

15 Claims, 5 Drawing Sheets

DVD MENU REPRESENTATION VIA OPTICAL CHARACTER RECOGNITION

BACKGROUND

The present disclosure relates to an entertainment system mounted on a vehicle for providing occupants with audio and/or video programs played by a device such as a CD player, DVD player, AM/FM tuner or cassette player. More specifically, the disclosure relates to an entertainment system in which a driver or front passenger can control a rear video source that provides audio and video for rear seat occupants while minimizing visual distractions on a front display screen.

Systems comprising audio devices such as a CD player, cassette player, and AM/FM tuner for providing audio services and audio-visual devices such as a TV tuner and DVD player for providing audio and video services are increasingly popular for use with vehicles. Occupants in a vehicle equipped with such a system can enjoy audio and/or video programs from various types of sources. Conventionally, such an entertainment system can be controlled by a head unit (H/U) that is typically mounted on a dashboard in the front seat area. A desired source is selected by buttons provided on the H/U. Occupants in the vehicle can enjoy audio and/or video programs from the selected source.

A rear entertainment system (RES) can include a rear control unit provided in the rear seat area. Rear seat occupants can select a source by operating the rear control unit to enjoy audio and/or video programs from the selected source. In some systems, the rear seat occupants can select a rear source that is different from a front source selected on the head unit by the driver or front passenger (the front sources usually limited to audio sources).

Japanese Patent Application Unexamined Publication (Kokai) No. 2001-114027 discloses an audiovisual reproducing device mounted on a vehicle. The audiovisual reproducing device comprises a main control unit provided in the front seat area and a rear control unit provided in the rear seat area. The rear control unit includes a holder into which a plug of a headphone is inserted, buttons for selecting a rear source, buttons for operating the selected rear source, a volume button, and a display for showing the kind of the selected rear source. Rear seat occupants turn on the rear control unit by inserting the plug of the headphone into the holder. The rear seat occupants can select a rear source that is different from a front source selected by the driver or front passenger to enjoy audio and/or video programs from the selected rear source using the headphone.

U.S. Pat. No. 5,661,811 discloses an audio system mounted on a vehicle. The audio system comprises a front control unit provided in the front seat area and a rear control unit provided in the rear seat area. The rear control unit comprises a power switch, buttons for selecting a rear audio source, and buttons for operating the selected rear audio source. When the audio system is turned on, only the front control unit is available. The rear control unit remains in an "off" state. If the rear control unit is turned on by the power switch, headphones are enabled and rear speakers are disconnected. A rear user can select a rear audio source different from a front audio source selected by a front user to enjoy audio programs from the rear audio source using the headphone.

The rear entertainment system as described above in reference to the '811 patent is useful for a rear user to select a rear source that is different from a front audio source selected by a front user. However, it may be difficult and/or undesirable for some rear users to operate a rear control unit provided in the rear seat area. For example, when a small child sits in the rear seat, it may be difficult to select a desired source and change a channel by operating the rear control unit. Additionally, pressing an operating button just for fun may lead to misoperation of the rear control unit.

Moreover, when a user who is unfamiliar with operating an entertainment system mounted on a vehicle is in the rear seat, operating a rear control unit may be difficult. Also, since the rear control unit is provided in the rear seat area, it is difficult for a front user to stretch out his/her arm and operate the rear control unit for the rear user.

BRIEF DESCRIPTION

According to one aspect of the disclosure, an entertainment system for a vehicle is provided comprising a front display screen in a front seat area of the vehicle and a rear display screen in a rear seat area of the vehicle. The entertainment system further provides a DVD player for reading a DVD including video content of the DVD. The DVD player can be connected to the rear display screen for displaying the video content of the DVD thereon. The video content can include a DVD menu. A controller can be connected to the DVD player and the front display screen. The controller generates a DVD menu representation corresponding to the DVD menu for display on the front display screen.

According to another aspect, a method of minimizing visual distractions on a front display screen in a front seat area of a vehicle is provided when operating a DVD player for playback on a rear display screen in a rear seat area of the vehicle. More particularly, in accordance with this aspect, video content from a DVD is read. The video content includes a DVD menu. The DVD menu is displayed on the rear display screen. A DVD menu representation corresponding to the DVD menu is generated. The DVD menu representation has any graphical images of the DVD menu suppressed. The DVD menu representation is displayed on a rear display screen in a rear seat area of the vehicle.

According to yet another aspect, an entertainment system for a vehicle is provided that minimizes visual distractions on a front display screen of the vehicle when operating a DVD player in a front seat area of the vehicle for playback in a rear seat area of the vehicle. More particularly, in accordance with this aspect, the entertainment system includes a DVD player for reading video content from a DVD. The video content includes a DVD menu. The system further includes a controller for processing the video content, including the DVD menu, and generating a DVD menu representation corresponding to the DVD menu. The DVD menu including visual images and menu text. The DVD menu representation including only the menu text without the visual images.

DETAILED DESCRIPTION

Figure 1:
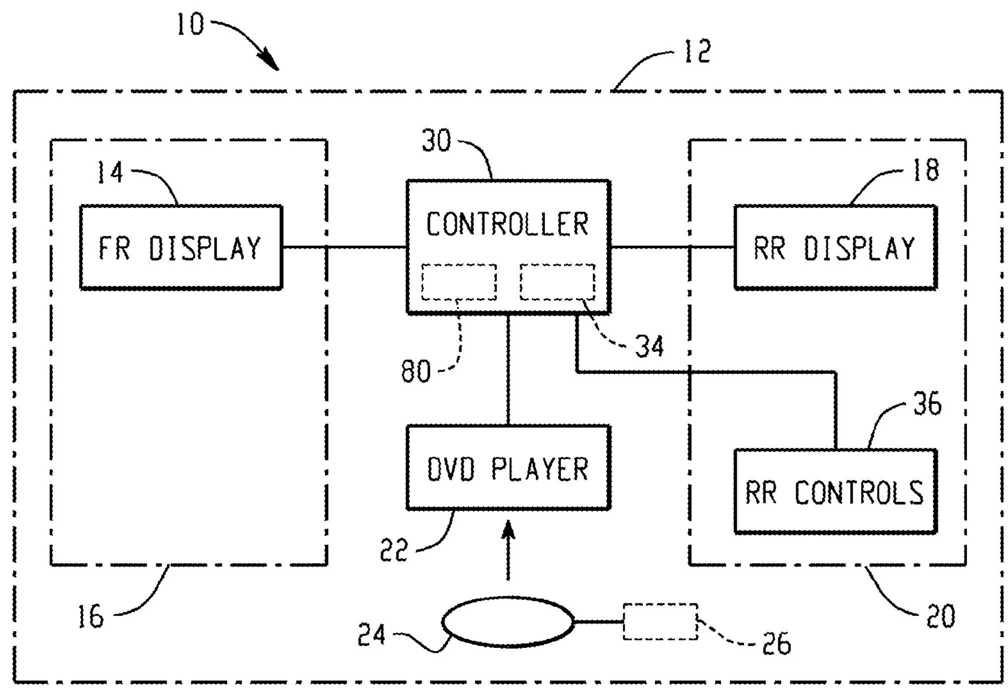
FIG. 1 is a schematic diagram showing a configuration for an entertainment system for a vehicle.
Figure 4:
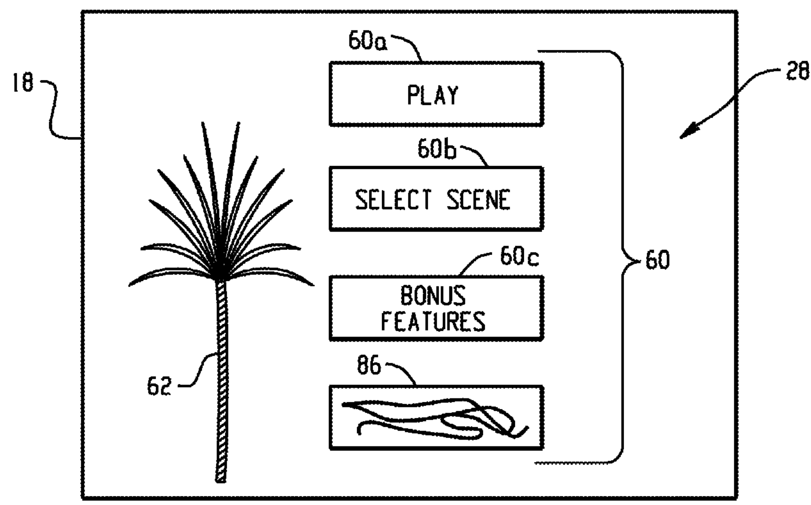
FIG. 4 is a schematic view of an exemplary DVD menu for display on a rear display screen.
Figure 5:
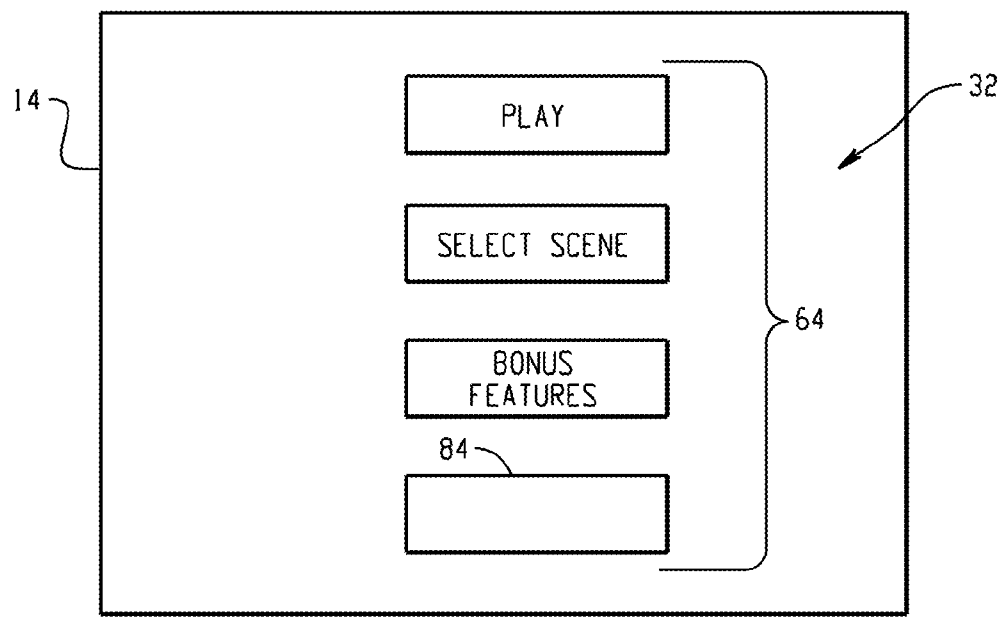
FIG. 5 is a schematic view of an exemplary DVD menu representation corresponding to the DVD menu of FIG. 4 for display on a front display screen.

Referring now to the drawings, wherein the showings are for purposes of illustrating one or more exemplary embodiments, FIG. 1 shows an entertainment system 10 for a vehicle 12 including a front display screen 14 in a front seat area 16 of the vehicle 12 and a rear display screen 18 in a rear seat area 20 of the vehicle 12. The system 10 further includes a DVD player 22 for reading a DVD 24, including video content 26 of the DVD. The DVD player 22 is operatively connected to the rear display screen 18 for displaying the video content 26 of the DVD 24 thereon. The video content 26 of the DVD 24 includes a DVD menu 28 (FIG. 4). A controller 30 is operatively connected to the DVD player 22, the rear display screen 18, and the front display screen 14. As will be described in more detail below, the controller 30 generates a DVD menu representation (e.g., DVD menu representation 32 of FIG. 5) that corresponds to the DVD menu 28 for display on the front display screen 14.

The system 10 can additionally include front controls disposed in the front seat area 16 that, among other functions, operate the DVD player 22 according to the DVD menu representation (e.g., DVD menu representation 32) displayed on the front display screen 14. In the embodiment illustrated in FIG. 1, the front controls can be integrally provided with the front display screen 14. For example, the front display screen can be a touch-type screen wherein selections and input for the controller 30 are provided by touching predetermined portions of the display screen 14. In vehicles equipped with a navigational system and screen, the navigational screen can serve as the front display screen 14 and menu items displayed thereon can be selected, and thus input received by the controller 30, through touching various portions of the display screen. That is, the front display screen 14 can be a touch screen interface that integrally includes the front controls, wherein the front controls are displayed on the display screen or touch screen interface 14 and are operable by selective touching of designated areas of the touch screen interface 14. In the arrangement wherein the display screen 14 is a touch screen interface and a navigational screen, appropriate navigational software 34 can be provided in or in association with the controller 30 for providing navigational functionality to the display screen 14 as is known and understood by those skilled in the art.

The system 10 can further include rear controls 36 disposed in the rear seat area 20 of the vehicle 12 that operate the DVD player 22 in conjunction with the DVD menu 28 displayed on the rear display screen 18. The rear controls 36 are operatively connected to the controller 30 and the DVD player 22. Though shown as a separate component, it is to be appreciated by those of skill in the art that the rear controls 36 could be integrally provided with the DVD player 22 (or some other component).

Figure 2:
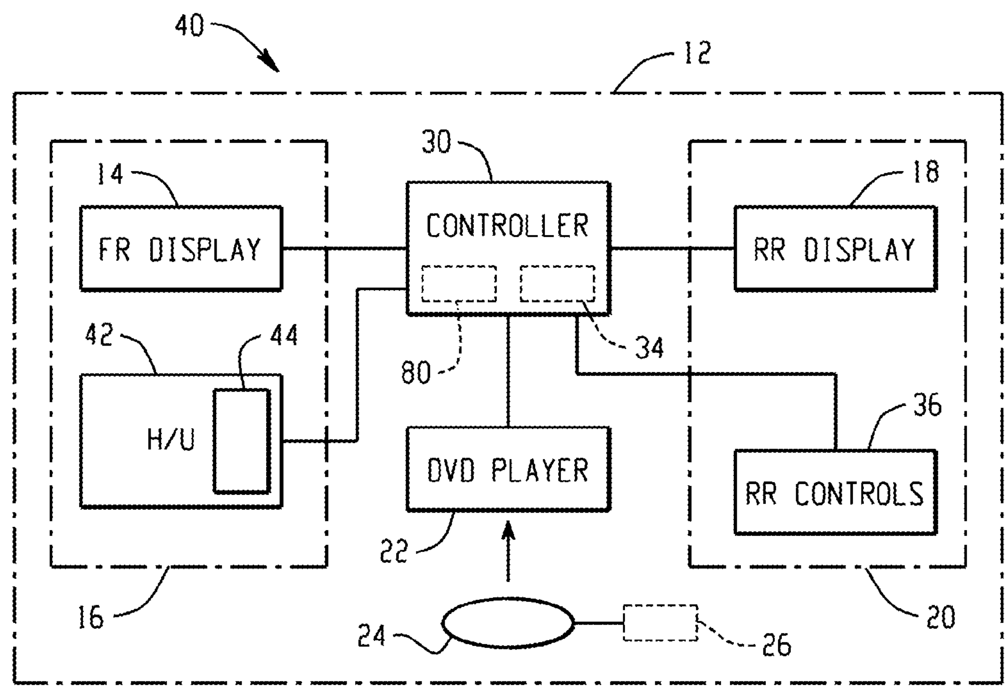
FIG. 2 is a schematic diagram showing an alternate configuration for an entertainment system for a vehicle.

With reference to FIG. 2, an alternate configuration for an entertainment system for a vehicle is shown and generally designated by reference numeral 40. The alternate system 40 is generally the same as the system 10 except as noted herein. One difference between the systems 10 and 40 is that the system 40 is shown including a head unit (H/U) 42 disposed in the front seat area 16 of the vehicle 12. In such an arrangement, front controls 44 can be included as part of the head unit 42 for controlling or operating the DVD player 22 according to the DVD menu representation displayed on the front display screen 14. When employed, the head unit 42 can be operatively connected to the controller 30 for delivering input from the front controls 44 to the controller 30 or the controller 30 can be integrally provided with the head unit 52 (e.g., a controller of the head unit operates the DVD player 22 and perform various functions of the head unit).

Figure 3:
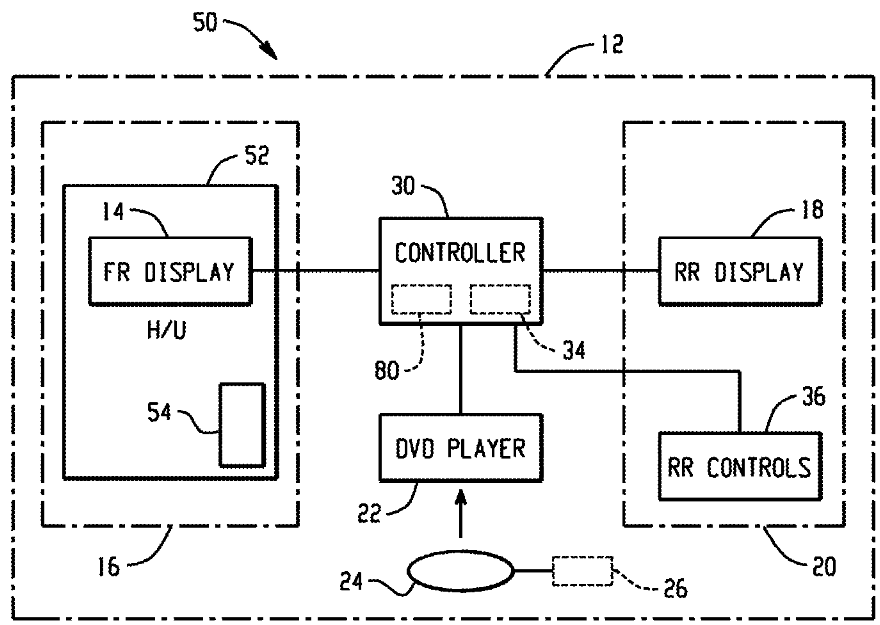
FIG. 3 is a schematic diagram showing another alternate configuration for an entertainment system for a vehicle.

With reference now to FIG. 3, another alternate configuration is shown for an entertainment system for a vehicle generally designated by reference numeral 50. The system 50 is generally the same as the system 40 except as noted herein. One difference in the system 50 from the system 40 is the inclusion of a head unit 52 having the front display screen 14 provided integrally therewith. Of course, the front controls 54 can additionally be provided, or alternately provided, as part of the front display screen 14 wherein the front display screen is a touch-type screen and/or a navigational screen as already described in reference to the system 10. Like the system 40, the head unit 52 can be operatively connected to the controller 30 or the controller 30 can be integrally provided with the head unit 52.

With reference to FIG. 4, an exemplary DVD menu 28 is illustrated, wherein the menu 28 includes menu items 60 and graphical video data 62. The menu items 60 can be particular to the DVD 24 being read by the DVD player 22. As shown, typical menu items can include, for example, a play button or item 60*a*, a scene select button or item 60*b*, a bonus feature button or item 60*a*, etc. With additional reference to FIG. 5, the DVD menu representation 32 that the controller 30 derives from the DVD menu 28 includes only representative menu items 64 without any graphical video data, such as the video data 62 of the DVD menu 28. The representative menu items 64 generally correspond to the menu items 60 of the DVD menu 28 (as shown).

Figure 6:
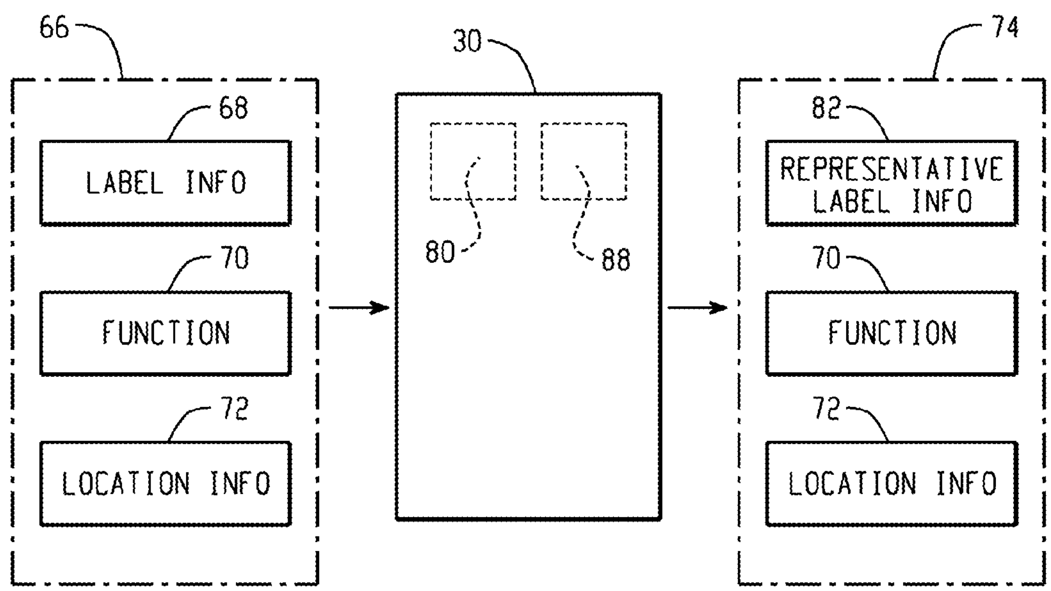
FIG. 6 is a schematic view of a DVD menu item being processed by a controller of an entertainment system into a representative menu item.

With still further reference to FIG. 6, a schematically illustrated menu item, such as one of the menu items 60 of the DVD menu 28, is indicated by reference numeral 66. The menu item 66 can include, as can all of the menu items 60, include label information 68, a function 70, and location information 72. Label information 68 can be text and/or graphical information, typically identifying the function of the menu item 66. The function 70 can be one or more events or actions that occur when the menu item 66 is selected, such as through front or rear controls of one of the entertainment system embodiments described above. Location information 72 can be information specifying where on a display screen the item 66 is to be displayed and/or how the item 66 is to be selected (e.g., where on a screen a user should touch or move a cursor). The controller 30 can process each of the menu items 60, such as schematically illustrated menu item 66, to produce the representative menu items (.e.g., representative menu item 74). Thus, for example, the controller 30 can process a menu item, such as menu item 66, to generate a representative menu item, such as representative menu item 74. Accordingly, the representative menu items 64 of the DVD menu representation 32 correspond respectively to the menu items 60 of the DVD menu 28.

After processing, the controller 30 displays each of the representative menu items 64 on the front display screen 14 according to the location information 72 of the corresponding menu item 60 and actuates the function 70 of the corresponding menu item when the representative menu item 74 is selected. More particularly, by example, menu item 66 is used to generate representative menu item 74. The location information of the menu item 66 can be the same or used for deriving location information of the representative menu item 74. The function 70 of the menu item 66 can be the same function for the representative menu item 74. The text portion, if any, of the label information 68 can be used to identify or label the representative item 74.

To facilitate in processing the DVD menu 28, the controller 30 can additionally include an optical character recognition (OCR) engine 80 for reading the label information, such as label information 68, of each of the menu items 60 of the DVD menu 28 and generating representative label information, such as representative label information 82 (FIG. 6) to be displayed on the front display screen 14 for each of the representative menu items 64 of the representative DVD menu 32. In particular, the OCR engine 80 can generate corresponding representative label information for each of the menu items and isolate menu item text from any graphical images of the DVD menu 28 (e.g., graphical image 62). Optionally, the OCR engine 80 can generate a blank menu button, such as illustrated blank menu button 84, for display on the front display screen 14 as the DVD menu representation 64 for any menu item of the DVD menu 28 that does not include readable text, such as illustrated DVD menu item 86.

In one embodiment, the representative label information, such as representative label information 82, includes a text label selected from a catalog of text labels 88 stored in the controller 30. In this arrangement, the OCR engine 80 determines the appropriate text label from the catalog of text labels 88 for each menu item in the DVD menu having readable text. For example, as illustrated in the DVD menu 28 and its menu items 60, many of the menu items 60 have standard labels, such as play, select scene, bonus features, etc. and/or derivations thereof. Using a preloaded set of standard text labels in the catalogue 88, the OCR engine 80 can better determine what labels to use when generating the DVD menu representation 64.

In operation, the controller 30 actuates the function 70 shared by one of the representative menu items 64 on the DVD menu representation 32 when the menu item is selected. For example, should blank item 84 be selected from the DVD menu representation 32, the function shared by blank button 84 and button 86 of the DVD menu 28 is actuated. In one embodiment, the controller 30 can automatically actuate the function shared by one of the representative menu items 64, wherein the selected one of a representative menu items 34 is selected based on its probability to autoplay the DVD 24. For example, for most DVDs, a limited lexicon is used to indicate the menu features available on the DVD. For instance, a common menu might have the words "Play," "Scene Select," "Bonus Features," and "Setup." Given the default menu button upon loading the DVD menu (e.g., the first menu item) and a lookup of the words parsed by the OCR engine 80 for the DVD menu representation 64, the controller 30 can decide the most likely option to play the DVD.

Figure 7:
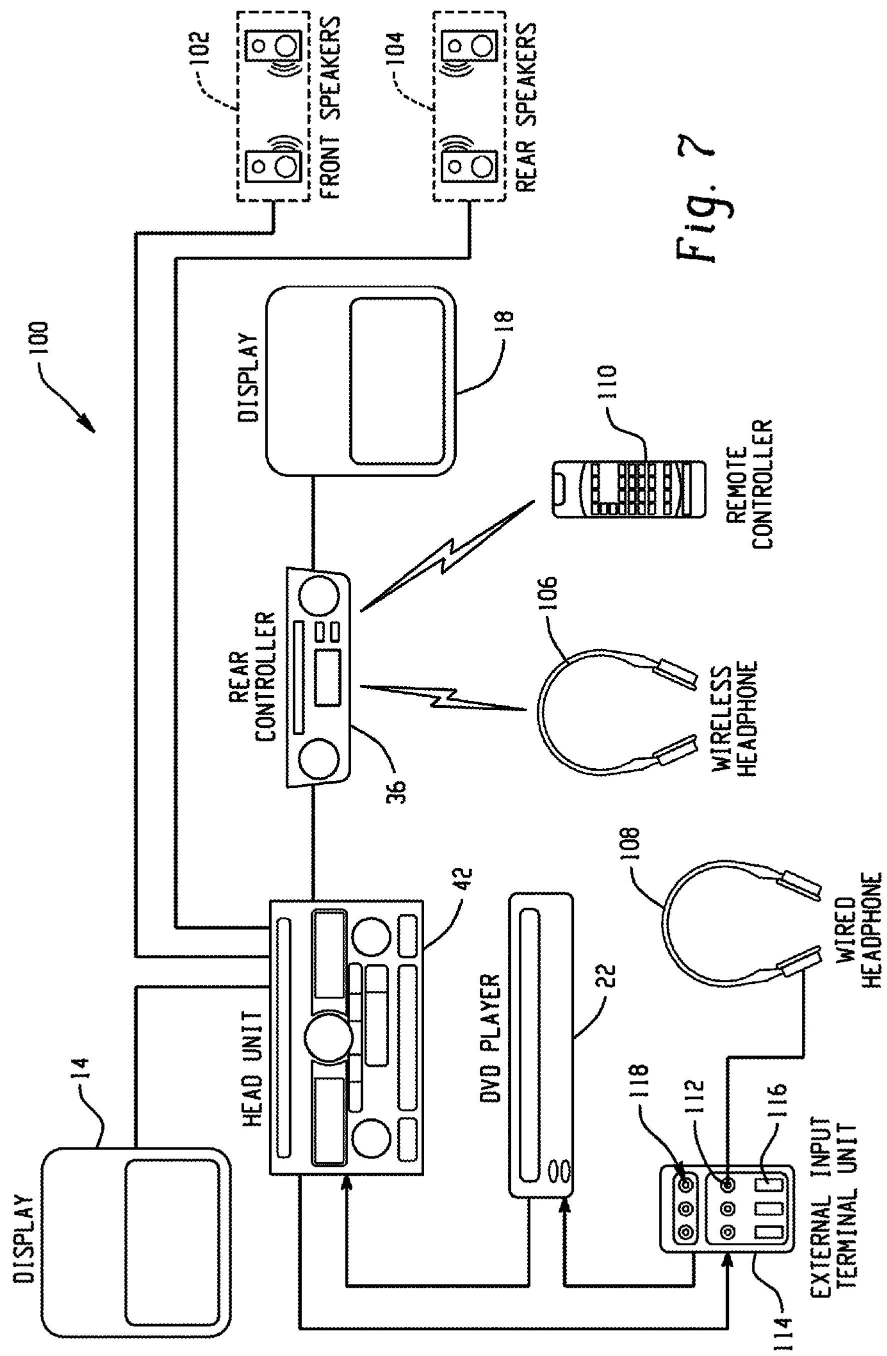
FIG. 7 is a more detailed schematic diagram showing yet another alternate configuration for an entertainment system for a vehicle.

With reference to FIG. 7, another configuration for an entertainment system for a vehicle is shown and generally designated by reference numeral 100. The system 100 can generally be the same as the system 40 except as indicated herein. For example, the system 100 can include front display screen 14 disposed in a front seat area of a vehicle and rear display screen 18 disposed in a rear seat area of the vehicle. The system 100 can also include DVD player 22, rear controller 36, head unit 42, and a controller (not shown in FIG. 7). Like the system 40, the DVD player 22 can read video content of a DVD, including a DVD menu, and a DVD menu representation corresponding to the DVD menu can be generated and displayed on the front display screen 14.

Figure 8B:
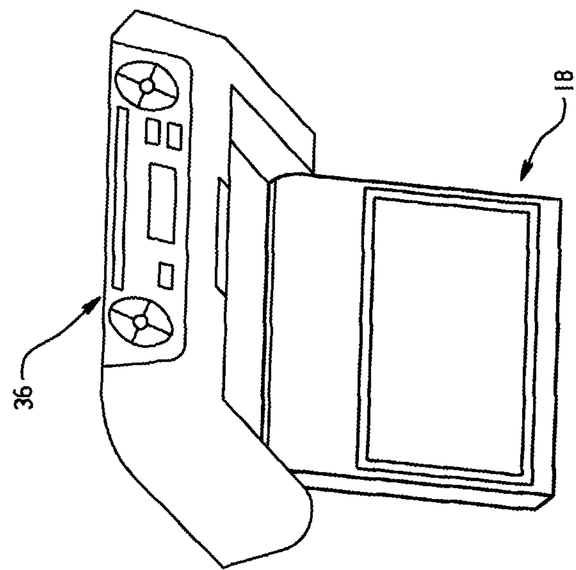
FIGS. 8(*a*)-8(*b*) show examples of placement of a head unit, a rear controller and a DVD player, of an entertainment system such as that of FIG. 7.
Figure 8A:
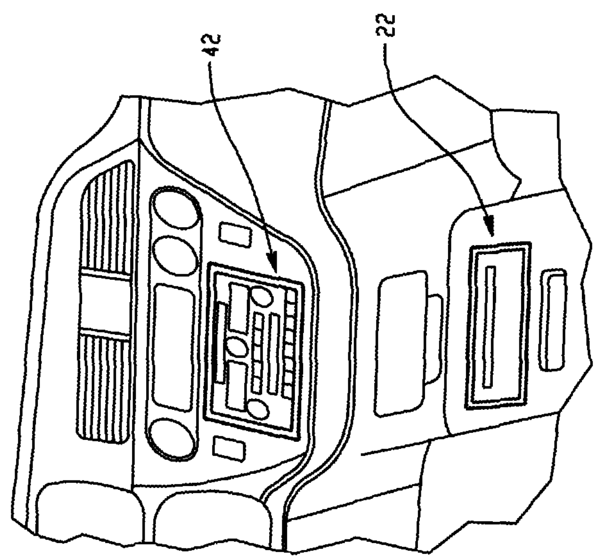

The head unit 42 can be mounted on a dashboard in the front seat area 16 of the vehicle 12 so that a front user (e.g., a driver) can operate the head unit 42 (see FIG. 8(*a*)). Speakers 102 can be provided in the front seat area, which are hereinafter referred to as front speakers. Speakers 104 can be provided in the rear seat area of the vehicle, which are hereinafter referred to as rear speakers. A front user can operate the head unit 42 to select a source including an audio component to be connected to the speakers 102 and 104 (hereinafter, referred to as a front source) and control the selected source. Headphones 106 and 108 can be provided in the rear seat area. A front user can operate the head unit 42 to select a rear source including an audio component to be connected to the headphones 106 and 108 and control the selected rear source. An AM/FM tuner, cassette tape player, CD player, and a display/control screen can be mounted on, disposed within or connected with the head unit 42 as is known and understood by those of skill in the art.

As shown in FIG. 8(*b*), the rear controller 36 can be mounted on the ceiling of the vehicle so that a rear user can operate it. Alternatively, the rear controller may be provided in another location proximate a location or locations where a rear user might sit, such as a center armrest provided in the rear seat. A user in the rear seat can operate the rear controller 36 to select the rear source and control the selected rear source. If the system 100 is so configured, a rear user can optionally use a remote controller 110 to operate the rear controller 36. Thus, the entertainment system 100 according to this embodiment is configured so that not only the rear controller 36, but also the head unit 42, can select the rear source and control the selected rear source. An exemplary head unit and an exemplary rear controller are taught in commonly owned U.S. Pat. No. 7,190,798, expressly incorporated herein by reference.

In one embodiment, at least two front speakers 102 are provided, one front left, the other front right. Similarly, at least two rear speakers 104 are provided, one rear left, the other rear right. The headphone 108 is shown as a wired headphone. When so configured, the wired headphone 108 can be connected to a headphone terminal 112 provided on an external input terminal unit 114. A volume button 116 for adjusting the volume of the wired headphone 108 can be provided on the external input terminal unit 114 so that a rear user can adjust the volume of the headphone 108 by operating the volume button 116.

The headphone 106 is shown as a wireless headphone (e.g., one employing an infrared receiver). The wireless headphone 106 communicates with the rear controller 36, such as through the infrared receiver, for example. A volume button could be provided outside the headphone earcup. If so provided, the volume of the wireless headphone 106 can be adjusted by the volume button. In this embodiment, a rear user can use the wired headphone 108 or the wireless headphone 106 to listen to sound from the rear audio source. Of course, the entertainment system 100 can have alternative configurations and need not be limited to the illustrated embodiment. For example, any number of speakers can be provided in the front and in the rear and other headphone configurations can be used (e.g., both wired, both wireless, other wireless, other wireless links, such as RF, etc.).

With reference to FIGS. 8(*a*) and 8(*b*), the rear display 18 can be mounted on the ceiling of the vehicle so as to be viewable by rear occupants of the vehicle. The DVD player 22, which can be connected to the head unit 42 and the external input terminal unit 114, can be provided below the dashboard so that a front user can operate the DVD player 22. The display device 18 can be connected to the rear controller 36. In the exemplary embodiment shown, the display device 18 is integrated with the rear controller 36. Alternatively, the display device may be provided in a location other than the location in which the rear controller 36 is provided. When the DVD player or an AUX input for providing video programs is selected as the rear source, video programs from the selected rear source are displayed on the screen of the display device 18 for viewing in the rear of the vehicle.

When included in the system 100, the external input terminal unit 114 can be disposed in the rear seat area 20. The external input terminal unit 114 can include an external input terminal 118 to which an external audiovisual device such as a video game machine or a video camera can be connected, the headphone terminal 112 to which the wired headphone 108 can be connected as described above, and the volume button 116. A rear user can connect an external device to the external input terminal 118 so as to enjoy a game or video programs on the screen of the display device 18. Audio and video signals from the external device can be sent to the head unit 42 (or the controller of the system 100) via the DVD player 22 in the illustrated system. The head unit 42 can send the audio signal to the wired headphone 108 via the headphone terminal 112. The head unit 42 can further send the audio and video signals to the rear controller 36. The rear controller 36 can send the received audio signal to the wireless headphone 106 and sends the received video signal to the display device 18.

For any of the systems 10, 40, 50, 100, a method of minimizing visual distractions on the front display screen 14 in the front seat area 16 of the vehicle 12 when operating the DVD player 22 for playback on the rear display screen 18 in the rear seat area 20 of the vehicle 12 will now be described. First, the DVD player 22 reads video content 26 from DVD 24. As already discussed, the video content 26 can include a DVD menu. The DVD menu 26 of the video content 26 can be displayed on the rear display screen 18 in the rear seat area 20. A DVD menu representation 32 can be generated that corresponds to the DVD menu 28. The DVD menu representation 32 has any graphical images of the DVD menu 28, such as graphical image 62, suppressed. The DVD menu representation 28 can be displayed on the front display screen 14 in the front seat area 16 of the vehicle 12. When reading the video content 26 from the DVD 24, OCR engine 80 of controller 30 can be used to isolate text of the DVD menu 28 from graphical images, such as sample graphical image 62, of the DVD menu 28. The isolated text can then be used to generate the DVD menu representation 32. In one embodiment, one item of the plurality of menu items 60 of the DVD menu 28 can be actuated. The one item of the plurality of menu items 60 can be selected based on a probability that it will autoplay the DVD 24. More particularly, in generating the DVD menu representation 32, the menu items 60 are analyzed to determine which such menu item will have a function most likely or probable to autoplay the DVD 24.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the DVD player 22 and the rear controls 36 may suitably be integrated together, the controller 30 and the head unit 42 or 52 may suitably be integrated together, etc. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the controller 30 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An entertainment system for a vehicle that minimizes visual distractions on a front display screen of the vehicle when operating a DVD player from a front seat area of the vehicle for playback on a rear display screen in a rear seat area of the vehicle, comprising:

a DVD player reading video content including a DVD menu with menu items having visual images and menu text from a DVD;

a controller configured to process the video content, including the DVD menu, to generate a DVD menu representation corresponding to the DVD menu when the DVD is read by said DVD player, said controller is configured to generate the DVD menu representation to include representative menu items having only the menu text of the menu items without the visual images of the menu items, said controller is configured to simultaneously: display the DVD menu with the menu items including the menu text and visual images on the rear display screen; and display the DVD menu representation including only the menu text of the menu items without the visual images on the front display screen, a rear control disposed in the rear seat area that interfaces with the DVD menu displayed on the rear display screen and operates the DVD player according to a selection by the rear control of one of the DVD menu items, and a front control disposed in the front seat area that interfaces with the DVD menu representation displayed on the front display screen and operates the DVD player according to a selection by the front control of one of the DVD menu representation items, wherein each of the menu items further includes label information, a function and location information, wherein the location information specifies where on the rear display screen the menu item is to be displayed, and wherein the DVD menu representation includes representative menu items corresponding respectively to the menu items of the DVD menu, each of the representative menu items displayed on the front display screen according to the location information of the corresponding menu item so as to be located at a same position on the front display screen as the corresponding menu item is on the rear display screen, and sharing the function of the corresponding menu item.

2. The entertainment system of claim 1 wherein said controller includes an OCR engine for processing said video content and generating said DVD menu representation without said visual images.

3. The entertainment system of the claim 2 wherein the controller includes an optical character recognition (OCR) engine, the OCR engine reads label information for each of the menu items of the DVD menu and generates representative label information to be displayed on the front display screen for each of the representative menu items when generating the DVD menu representation.

4. The entertainment system of claim 3 wherein the OCR engine generates a blank menu button for display on the front display screen as one of the representative menu items for any menu item of the DVD menu that does not include readable text.

5. The entertainment system of claim 3 wherein the controller includes a memory having a catalogue of text labels and the representative label information includes a text label selected from the catalogue of text labels stored in the controller, the OCR engine determines the appropriate text label from the catalogue of text labels for each menu item of the DVD menu.

6. An entertainment system for a vehicle comprising:

a front display screen in a front seat area of the vehicle;

a rear display screen in a rear seat area of the vehicle;

a DVD player reading a DVD including video content having a menu of the DVD, the DVD player connected to the rear display screen and displaying the video content of the DVD thereon;

a controller connected to the DVD player, the rear display screen and the front display screen, wherein the controller is configured to process video content received from the DVD player to generate a DVD menu representation corresponding to the DVD menu, and to display the DVD menu representation on the front display screen when the DVD is read by the DVD player, wherein the DVD menu has menu items and visual graphics, the visual graphics including graphical video data, and the controller is configured to generate the DVD menu representation to have menu items corresponding to the DVD menu items but with reduced visual graphics relative to the DVD menu displayed on the rear display screen, a rear control disposed in the rear seat area that interfaces with the DVD menu displayed on the rear display screen and operates the DVD player according to a selection by the rear control of one of the DVD menu items, and a front control disposed in the front seat area that interfaces with the DVD menu representation displayed on the front display screen and operates the DVD player according to a selection by the front control of one of the DVD menu representation items, wherein the controller is configured to generate the DVD menu representation to include only the menu items without the graphical video data, and the controller is configured to simultaneously: display the DVD menu representation including only the menu items without the graphical video data on the front display screen; and display the DVD menu including the menu items and the graphical video data on the rear display screen, and wherein each of the menu items includes label information, a function and location information, wherein the location information specifies where on the rear display screen the menu item is to be displayed, and wherein the DVD menu representation includes representative menu items corresponding respectively to the menu items of the DVD menu, each of the representative menu items displayed on the front display screen according to the location information of the corresponding menu item so as to be located at a same position on the front display screen as the corresponding menu item is on the rear display screen, and sharing the function of the corresponding menu item.

7. The entertainment system of claim 6 wherein the front display screen is a touch screen interface that includes the front controls, the front controls displayed on the touch screen interface and operable by selective touching of designated areas of the touch screen interface.

8. The entertainment system of claim 7 wherein the touch screen interface is a navigational screen associated with navigational software.

9. The entertainment system of claim 6 further including a head unit disposed in the front seat area, the head unit including the front controls.

10. The entertainment system of claim 9 wherein the head unit includes the front display screen.

11. The entertainment system of the claim 6, wherein the controller includes an optical character recognition (OCR) engine, wherein the OCR engine reads the label information of each of the menu items of the DVD menu and generates representative label information to be displayed on the front display screen for each of the representative menu items when generating the DVD menu representation.

12. The entertainment system of claim 11 wherein the OCR engine generates a blank menu button for display on the front display screen as the DVD menu representation for any menu item of the DVD menu that does not include readable text.

13. The entertainment system of claim 11 wherein the controller indicates a memory having a catalogue of text labels and the representative label information includes a text label selected from the catalogue of text labels stored in the controller, the OCR engine determines the appropriate text label from the catalogue of text labels for each menu item of the DVD menu.

14. The entertainment system of claim 6 wherein the controller includes an optical character recognition (OCR) engine for reading label information of the menu items of the DVD menu.

15. The entertainment system of claim 14, wherein the controller actuates the function shared by one of the representative menu items on the DVD menu representation, the one of the representative menu items selected based on its probability to autoplay the DVD.

* * * * *